3,217,010
3-AMINO-4-CYANO-5,5 DI-LOWER ALKYL-2-CYCLOHEXENE 1-ONES
Hans Herbert Kühnis and Rolf Denss, Basel, Switzerland, assignors to Geigy Chemical Corporation, Ardsley, N.Y., a corporation of Delaware
No Drawing. Filed June 21, 1962, Ser. No. 204,059
Claims priority, application Switzerland, June 22, 1961, 7,292/61; Mar. 2, 1962, 2,555/62
14 Claims. (Cl. 260—294.3)

The present invention concerns new cyclohexene derivatives which have valuable pharmacological properties and are useful as pharmaceutical agents. The invention also pertains to processes for their manufacture.

Up to now, cyclohexene derivatives of the formula

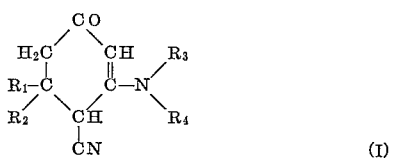

wherein $R_1$ and $R_2$ independently of each other represent lower alkyl and $NR_3R_4$ represents amino, Monoalkylamino having at most 12 carbon atoms,
Lower alkenylamino,
Di-(lower alkyl)amino,
Amino-(lower alkylene)-amino,
Di-(lower alkyl)-amino-(lower alkylene)-amino,
Hydroxy-(lower alkylene)-amine,
Phenylamino, (=anilino),
Chlorophenylene-amino,
Bromophenylene-amino,
Nitrophenylene-amino,
Hydroxyphenylene-amino,
(Lower alkoxy)-phenylene-amino,
Acetyl-phenylene-amino,
Benzylamino,
Chlorobenzylamino,
Bromobenzylamino,
Nitrobenzylamino,
Lower alkylbenzylamino,
N-lower alkoxybenzyl-N-lower alkyl-amino,
Di-(lower alkyl)-aminobenzylamino,
Phenyl-(lower alkylene)-amino,
N-lower alkyl-anilino,
N-benzyl-N-lower alkyl-amino,
N-(chloro-benzyl)-N-lower alkyl-amino,
N-(bromo-benzyl)-N-lower alkyl-amino,
N-(nitro-benzyl)-N-lower alkyl-amino,
N-(lower alkyl-benzyl)-N-lower alkyl-amino,
N-(lower alkoxy-benzyl)-N-lower alkyl-amino,
N-(methylenedioxy-benzyl)-N-lower alkyl-amino,
N-[di-(lower alkyl)-amino benzyl]-N-lower alkyl-amino,
N-phenyl-(lower alkylene)-N-lower alkyl-amino,
Dibenzylamino,
Naphthylamino,
Cycloalkylamino,
N-cycloalkyl-N-lower alkyl-amino,
N-(cycloalkyl-lower alkylene)-amino,
N-(cycloalkyl-lower alkylene)-N-lower alkyl-amino,
1-pyrrolidyl,
Piperidino,
Pyridyl-lower alkylene-amino,
Furfurylamino,
Antipyrylamino,
N-furfuryl-N-lower alkyl-amino,
N-pyridyl-N-lower alkyl-amino,
N-[pyridyl-lower alkylene]-N-lower alkyl-amino,
4-phenyl-4-ethoxycarbonyl-piperidino,
Morpholino,
Phenylhydrazino, and
Propylidenehydrazino have not been known.

It has been found that, surprisingly, the compounds of the Formula I produced according to the invention have an excellent sedative, analgesic, antipyretic and antiphlosgistic action and also an excellent depresent action on the central nervous system with, at the same time, relatively slight toxicity. They are suitable in particular for the treatment of rheumatic conditions as well as for the removal or relief of pain due to various causes and for the treatment of conditions of psychic excitement and tension. They inhibit stimulation of the cough center.

Particularly effective and easily obtainable are the compounds of Formula I in which each of $R_1$ and $R_2$ is methyl.

More particularly, the 5,5-dimethyl cyclohexenones of Formula I in which —$NR_3R_4$ is a benzylamino group which is either unsubstituted or contains one or two of the substituents listed above, namely, especially hydroxy, lower alkyl, lower alkoxy, or nitro group, or chlorine, or bromine, are of special interest as sedatives, analgesics and cough-relieving agents.

Also the 5,5-dimethyl cyclohexenones of Formula I in which the benzylamino radical in —$NR_3R_4$ is replaced by an anilino radical which is either unsubstituted or has substituents which are essentially identical with those of value at the benzylamino radical, are of special interest, particularly as analgesics and cough-relieving agents.

The 5,5-dimethyl cyclohexenones of Formula I in which —$NR_3R_4$ is a mono-(lower alkyl)amino radical and more particularly those in which $R_3$ is hydrogen and $R_4$ an alkyl group with from 3 to 6 carbon atoms, e.g., iso-propyl, or n-butyl, or n-hexyl are also distinguished by a combination of good cough-relieving and analgesic activities.

A considerably analgetic activity is found, in particularly, in 5,5-dimethyl cyclohexenones of Formula I in which —$NR_3R_4$ is diethylamino, methylbenzylamino, ethyl-benzylamino, benzylamino, cyclohexylamino, n-hexylamino, isopropylamino, amino, dimethylamino and 4-ethoxycarbonyl-4-phenyl-piperidino.

Also cyclohexene derivatives of the formula

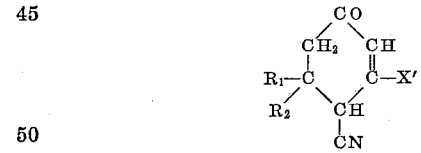

wherein

X' represents halogen and
$R_1$ and $R_2$ independently of each other represent lower alkyl, have not been known up to now.

The compounds of Formula IA are useful, for example, as starting materials for the manufacture of valuable pharmaceutical compounds. They are useful, in particular, for the manufacture of the compounds of Formula I, one possibility of this manufacturer being illustrated by the second one of the processes described hereinafter.

The qualification "lower" in the above definitions signifies a carbon content of $C_1$ to $C_4$ in the case of lower alkyl and lower alkoxy,
$C_2$ to $C_4$ in the case of lower alkylene,
$C_3$ or $C_4$ in the case of lower alkenyl, and
$C_3$ to $C_7$ in the case of lower cycloalkyl and lower polymethyleneimino.

The term "halogen" embraces chlorine and bromine.

In the compounds of the general Formula I and in the starting materials used for the production thereof $NR_3R_4$ represents, for example, amino, Alkylamino, such as methyl-, ethyl-, n-propyl-, isopropyl-, n-butyl-, isobutyl-, sec. butyl-, n-amyl-, isoamyl-, hexyl-, heptyl-, octyl-, nonyl-, decyl-, undecyl- or dodecylamino.
Lower alkenylamino, such as allyl-, methallyl- or crotylamino,
Lower dialkylamino, such as dimethyl-, diethyl-, dipropyl-, dibutyl-, N-methyl-ethyl-, N-methyl-propyl-, N-methyl-butyl-, N-ethyl-propyl, N-ethyl-butyl or N-propyl-butylamino,
Amino(lower)alkyl amino, such as β-amino-ethyl- or δ-amino-butylamino,
(Lower)dialkylamino(lower)alkyl amino, such as β-dimethylamino-ethyl-, β-dibutylamino-ethyl-, γ-dipropylamino-propyl- or δ-diethylamino-butylamino,
Hydroxy(lower)alkylamino, such as β-hydroxyethyl- or δ-hydroxybutylbutylamino, phenylamino, or
Phenyl(lower alkyl)amino, the phenyl radical of which radicals is unsubstituted or carries up to two substituents selected from among chlorine, bromine, nitro, hydroxy, lower alkoxy, lower alkyl or acetyl, i.e., for instance,
    o-, m- or p-chlorophenylamino or p-bromophenylamino,
    o-, m- or p-nitrophenylamino,
    o-, m- or p-hydroxyphenylamino,
    o-, m- or p-methoxyphenylamino, p-ethoxy-, p-propoxy-, or
    p-butoxyphenylamino,
    p-acetylphenylamino,
    benzylamino,
    o-, m- or p-chlorobenzylamino or p-bromobenzylamino,
    o-, m- or p-nitrobenzylamino,
    o-, m- or p-methyl-benzylamino, p-ethyl, p-propyl, or p-butyl-benzylamino,
    o-, m- or p-methoxybenzylamino, p-ethoxy-, p-propoxy-,
    p-butoxybenzylamino,
    3,4-dimethoxy-, 3,4-diethoxy-, 3,4-dipropoxy- or 3,4-dibutoxybenzylamino,
    p-dimethyl-, p-diethyl-, p-dipropyl- or p-dibutylaminobenzylamino,
    α-Phenylethyl-, β-phenylethyl-, γ-phenylpropyl-, or δ-phenylbutylamino
N-(lower)alkylphenylamino or N-(lower)alkylbenzylamino, the phenyl radical of which radicals is unsubstituted or carries up to two substituents selected from among chlorine, bromine, nitro, hydroxy, lower alkoxy, lower alkyl or acetyl, i.e., for instance,
    N-methyl-, N-ethyl-, N-propyl- or N-butylphenylamino,
    N-methyl-, N-ethyl-, N-propyl- or N-butylbenzylamino,
    N-methyl-, N-ethyl-, N-propyl- or N-butyl-o-, -m- or -p-chlorobenzylamino,
    N-methyl-p-bromobenzylamino,
    N-methyl-, N-ethyl-, N-propyl- or N-butyl-o-, -m- or -p-nitrobenzylamino,
    N-methyl-, N-ethyl-, N-propyl- or N-butyl-o-, -m- or -p-nitrobenzylamino,
    N-methyl-, N-ethyl-, N-propyl- or N-butyl-o-, -m- or -p-methyl-, -ethyl-, -propyl- or butylbenzylamino,
    N-methyl-, N-ethyl-, N-propyl- or N-butyl-o-, -m- or -p-methoxy-, -ethoxy-, -propoxy- or -butoxybenzylamino,
    N-methyl-, N-ethyl-, N-propyl- or N-butyl-p-dimethyl-, diethyl-, dipropyl- or dibutylamino-benzylamino,
    N-methyl-, N-ethyl-, N-propyl- or N-butyl-α- or-β-phenylethylamino,
    N-methyl-, N-ethyl-, N-propyl-, or N-butyl-γ-phenylpropyl- or -δ-phenylbutylamino, N-(lower)alkyl-3,4-methylenedioxy-benzylamino, such as
    N-methyl-, N-ethyl-, N-propyl- or N-butyl-3,4-methylene-dioxy-benzylamino,
    Dibenzylamino,
    α- or β-Naphthylamino,
Lower cycloalkylamino, such as
    Cyclopropyl-, cyclobutyl-, cyclopentyl-, cyclohexyl- or cycloheptylamino,
N-(lower)alkyl cyclohexylamino, such as
    N-methyl-, N-ethyl-, N-propyl- or N-butyl-cyclohexylamino, cyclohexyl-methyl-, -ethyl-, -propyl- or butylamino,
N-(lower)alkyl cyclohexyl(lower)alkylamino, such as
    N-methyl-, N-ethyl-, N-propyl- or N-butyl-cyclohexyl-methyl-, -ethyl-, -propyl- or butylamino,
    2,3- or 4-pyridylamino,
    3-pyridylmethyl-, -ethyl-, propyl- or butylamino,
    furfurylamino,
    antipyrylamino
N-(lower)alkyl pyridylamino, such as
    N-methyl-, N-ethyl-, N-propyl- or N-butyl-2-, -3- or -4-pyridylamino,
    N-methyl-4-pyridyl - methyl-, -ethyl-, -propyl- or butylamino,
    N-methyl-, N-ethyl-, N-propyl- or N-butyl-furfurylamino,
    1-azetidinyl-, 1-pyrrolidyl-, piperidino-, hexamethyleneimino-, or heptanmethylene-imino,
    4-phenyl-4-carbethoxy-piperidino,
    Morpholino,
    Phenylhydrazino or
    Propylidenehydrazino.

In the compounds of the general Formulas I and V, $R_1$ and $R_2$ independently represent methyl, ethyl, propyl or butyl.

The compounds of the Formula I can be produced by reacting a compound of the formula

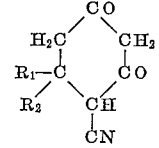

(II)

or a tautomeric form thereof, wherein $R_1$ and $R_2$ have the meanings given above, with a compound of the formula

(III)

The reaction is performed, for example, in a suitable organic solvent, in particular a lower alkanol, at room to boiling temperature of the solvent, if necessary in a closed vessel.

Starting materials of Formula II are obtained, for example, by condensing compounds of the formula

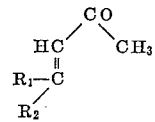

(IV)

wherein $R_1$ and $R_2$ have the meanings given above, with lower cyano-acetic acid (lower)alkyl esters, the condensation being performed in the presence of a basic condensing agent under strictly anhydrous conditions, e.g., by means of sodium methylate in anhydrous methanol at the boil. A number of compounds of the Formula IV are already known and others can be produced in an analogous manner, e.g., by condensation of suitable aldehydes or ketones with acetone.

It has further been found that compounds of the

Formula I can be produced by reacting a compound of the formula

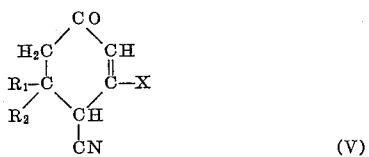

wherein

X represents a chlorine or bromine atom, a lower alkanesulfonyloxy or arylsulfonyloxy radical or a lower alkoxy group, and $R_1$ and $R_2$ have the meaenings given above, which Formula V thus comprises the novel intermediates of Formula IA described hereinbefore, with a compound of the general formula

wherein $R_3$ and $R_4$ have the meanings given above. The reaction is performed, for example, in a suitable organic solvent, in particular a lower alkanol, at room temperature or a higher temperature up to the boiling temperature of the solvent, if necessary in a closed vessel.

The new starting materials of the Formula IA, i.e., wherein X is a halogen atom are obtained by treatment of substituted 4-cyanocyclohexane-1,3-diones of the Formula II, defined above, with reactive inorganic acid halides or with phosgene. Phosphorius oxychloride, which simultaneously serves as reaction medium and is activated by the addition of a few percent of water, is particularly suitable. In addition, for the exchange of the hydroxyl group of the tautomeric enol form of compounds of the Formula II for halogen, phosphorus pentachloride, phosphorus trichlorodibromide and phosphorus tribromide can be employed, preferably in an equimolar amount in a suitable inert organic solvent or in phosphorus oxychloride. Because of their tendency to decompose, the halogen compounds of the Formula IA so obtained are generally reacted directly as crude products with amines of the Formula III.

Compounds of the Formula V having an alkane sulfonyloxy or arylsulfonyloxy radical as X are obtained, for example, by reaction of alkali metal salts of the enol forms of compounds of the Formula II with the corresponding sulfochlorides. Finally, compounds of the Formula V having a lower alkoxy group as X are obtained, for example, by reaction of the alkali metal salts of the enol forms of compounds of the Formula II with low alkyl halides or dialkyl sulfates. In addition, such alkoxy compounds are obtained, for example, by direct reaction of compounds of the Formula II with lower alkanols in the presence of suitable agents which split off water, e.g., concentrated hydrochloric acid.

It has further been found that compounds of the Formula I in which $R_1$ and $R_2$ are methyl groups and $R_4$ is hydrogen, can also be produced by reacting acetone, a cyanoacetic acid lower alkyl ester such as, e.g., the ethyl or methyl ester, and an amine of the formula

wherein $R_3$ has the meaning given above. The reaction is preferably performed in excess acetone at room temperature or a higher temperature up to the boiling temperature thereof.

To produce dosage units for peroral administration, the above-described active substances of Formula I are combined, e.g., with solid pulverulent carriers such as talcum, lactose, saccharose, sorbitol, mannitol, starches such as potato starch, corn starch or amylopectin, cellulose derivatives of gelatins, possibly with the addition of lubricants such as magnesium or calcium stearate or polyethylene oxides of suitable molecular weights (Carbowax) and disintegrating agents such as, e.g., alginic acid, laminaria powder or powdered lemon pulp, to form tablets or cores for sugarcoated tablets (dragées). The latter are coated, for example, with concentrated sugar solutions which can also contain, e.g., shellac, gum arabic, talcum and/or titanium dioxide. Dyestuffs are added to the dragées, e.g., to differentiate between the various contents of active substance. Soft gelatin capsules (pearl-shaped closed capsules) and other closed capsules consist, e.g., of gelatins and contain, for example, mixtures of the active substance with Carbowax, and hard gelatin capsules contain, for example, granulates of a compound of the Formula I with gelatins, magnesium stearate or stearic acid. Suppositories are examples of dosage units for rectal administration; they consist of combinations of compounds of the Formula I with a neutral fatty base.

To produce preparations for parenteral, e.g., intravenous or intramuscular, application, compounds of the Formula I are dissolved in water, if necessary with the addition of a suitable solubility promoter such as sodium benzoate and/or propylene glycol. Depending on the type of treatment desired, also substances having themselves antiphlogistic and/or analgetic activity can be used as solubility promoters such as sodium salicylate, acetyl salicylic acid, 1,2-diphenyl-4-n-butyl-3,5-dioxopyrazolidine, 1-(p-hydroxyphenyl)-2-phenyl-4-n-butyl-3,5-dioxopyrazolidine or the sodium salts of these compounds. Also emulsions of compounds of the Formula I are suitable for parenteral application; these contain e.g. lecithin preparations as emulsifying agents.

The following non-limitative examples further illustrate the production according to the invention of the new compounds. Parts are given therein as parts by weight unless otherwise stated; their relationship to parts by volume is as that of grams to cubic centimeters. The temperatures are in degrees centigrade.

*Example 1*

(a) A mixture of 11.5 parts by volume of mesityl oxide and 10.5 parts by volume of cyanoacetic acid ethyl ester is added to a solution of 5.4 parts of sodium methylate in 50 parts by volume of anhydrous methanol and the mixture is refluxed for 4 hours. After concentrating, water is added, the aqueous solution is extracted with ether, acidified with concentrated hydrochloric acid and then extracted with methylene chloride. The methylene chloride solution is dried with sodium sulfate and concentrated. On crystallizing the residue from aqueous ethanol, 5,5-dimethyl-6-cyano-cyclohexane-1,3-dione is obtained, M.P. 134–135°.

(b) 8.25 parts of 5,5-dimethyl-6-cyano-cyclohexane-1,3-dione, 4.6 parts by volume of aniline and 30 parts by volume of anhydrous ethanol are refluxed for 5 hours. On concentrating the ethanolic solution, the 3-anilino-4-cyano-5,5-dimethyl-2-cyclohexene-1 - one crystallizes out, M.P. 205°. It can be purified by recrystallization from ethanol.

The following compounds have been produced in an analogous manner:

3-(4'-nitro-anilino)-4-cyano-5,5-dimethyl-2-cyclohexene-1-one, M.P. 230–232°, 3-(4'-hydroxy-anilino)-4-cyano-5,5-dimethyl-2-cyclohexene-1-one, M.P. 232–233°, 3-(4'-methoxy-anilino)-4-cyano-5,5-dimethyl-2-cyclohexene-1-one, M.P. 202–203°, 3-(4'-acetyl-anilino)-4-cyano-5,5-dimethyl-2-cyclohexene-1-one, M.P. 216–218°, 3-(4'-bromo-anilino)-4-cyano-5,5-dimethyl-2-cyclohexene-1-one, 3-(4′-chloro-anilino)-4-cyano-5,5-dimethyl-2-cyclohexene-1-one, M.P. 230–231°, 3-(2′-hydroxy-anilino)-4-cyano-5,5-dimethyl-2-cyclohexene-1-one, M.P. 205–206°, 3-(3′-hydroxy-anilino)-4-cyano-5,5-dimethyl-2-cyclohexene-1-one, M.P. 219–220°, 3-(4′-ethoxy-anilino)-4-cyano-5,5-dimethyl-2-cyclohexene-1-one, M.P. 194–195°, 3-tert.butylamino-4-cyano-5,5-dimethyl-2-cyclohexene-1-one, M.P. 153–157°, 3-(4′-nitro-benzylamino)-4-cyano-5,5-dimethyl-2-cyclohexane-1-one, M.P. 223–224°, 3-(4′-chloro-benzylamino)-4-cyano-5,5-dimethyl-2-cyclohexene-1-one, M.P. 212–213°, 3-(4′-bromo-benzylamino)-4-cyano-5,5-dimethyl-2-cyclohexene-1-one, 3-(2′-methyl-benzylamino)-4-cyano-5,5-dimethyl-2-cyclohexene-1-one, M.P. 218–219°, 3-(3′-methoxy-benzylamino)-4-cyano-5,5-dimethyl-2-cyclohexene-1-one, M.P. 153–154°, 3-(4′-methoxy-benzylamino)-4-cyano-5,5-dimethyl-2-cyclohexene-1-one, M.P. 218–220°, 3-(3′,4′-dimethoxy-benzylamino)-4-cyano-5,5-dimethyl-2-cyclohexene-1-one, M. P. 198–199°, 3-(4′-dimethylamino-benzylamino)-4-cyano-5,5-dimethyl-2-cyclohexene-1-one, M.P. 234–236°, 3-naphthylamino-4-cyano-5,5-dimethyl-2-cyclohexene-1-one, M.P. 253–255°, 3-(N-methyl-4′-bromo-benzylamino)-4-cyano-5,5-dimethyl-2-cyclohexene-1-one, 3-(N-methyl-4′-chloro-benzylamino)-4-cyano-5,5-dimethyl-2-cyclohexene-1-one, M.P. 123–124°, 3-(N-methyl-2′-chloro-benzylamino)-4-cyano-5,5-dimethyl-2-cyclohexene-1-one, M.P. 154–156°, 3-(N-methyl-2′-methyl-benzylamino)-4-cyano-5,5-dimethyl-2-cyclohexene-1-one, M.P. 165–166°, 3-(N-methyl-3′-methyl-benzylamino)-4-cyano-5,5-dimethyl-2-cyclohexene-1-one, M.P. 163–164°, 3-(N-methyl-4′-methyl-benzylamino)-4-cyano-5,5-dimethyl-2-cyclohexene-1-one, M.P. 110–111°, 3-(N-methyl-4′-methoxy-benzylamino)-4-cyano-5,5-dimethyl-2-cyclohexene-one, M.P. 102–103°, 3-(N-methyl-3′-methoxy-benzylamino)-4-cyano-5,5-dimethyl-2-cyclohexene-1-one, M.P. 124–126°, 3-(N-methyl-4′-nitro-benzylamino)-4-cyano-5,5-dimethyl-2-cyclohexene-1-one, M.P. 150–151°, 3-(N-methyl-3′-nitro-benzylamino)-4-cyano-5,5-dimethly-2-cyclohexene-1-one, M.P. 155–158°, 3-(N-methyl-4′-dimethylamino-benzylamino)-4-cyano-5,5-dimethyl-2-cyclohexene-1-one, M.P. 129–131°, 3-(N-methyl-3′,4′-methylenedioxy-benzylamino)-4-cyano-5,5-dimethyl-2-cyclohexene-1-one, M.P. 139–141°, 3-(N-methyl-α-phenylethylamino)-4-cyano-5,5-dimethyl-2-cyclohexene-1-one, M.P. 116–120°, 3-(N-ethyl-benzylamino)-4-cyano-5,5-dimethyl-2-cyclohexene-1-one, M.P. 102–103°, 3-(N-propyl-benzylamino)-4-cyano-5,5-dimethyl-2-cyclohexene-1-one, M.P. 78–80°.

Example 2

16.5 parts of 5,5-dimethyl-6-cyano-cyclohexene-1,3-dione, 20.6 parts by volume of diethylamine and 30 parts by volume of anhydrous ethanol are heated for 4 hours at 160–170° in a closed vessel. After concentrating, the residue is extracted with benzene, the benzene solution is washed three times with aqueous 2N-sodium hydroxide solution, dried and concentrated. The 3-diethylamino-4-cyano-5,5-dimethyl-2-cyclohexene-1-one crystallizes from acetone/ether. M.P. 133–134°.

The following compounds are obtained in an analogous manner:

3-dimethylamino-4-cyano-5,5-dimethyl-2-cyclohexene-1-one, M.P. 141–142°, 3-(1-pyrrolidyl)-4-cyano-5,5-dimethyl-2-cyclohexene-1-one, M.P. 139–140°, 3-piperidino-4-cyano-5,5-dimethyl-2-cyclohexene-1-one, M.P. 136–137°, 3-morpholino-4-cyano-5,5-dimehyl-2-cyclohexene-1-one, M.P. 148–149°, 3-(N-methyl-anilino)-4-cyano-5,5-dimethyl-2-cyclohexene-1-one, M.P. 121–122°, 3-[N-methyl-(4′-pyridylmethyl)-amino]-4-cyano-5,5-dimethyl-2-cyclohexene-1-one, M.P. 158–160°, 3-(N-methyl-furfurylamino)-4-cyano-5,5-dimethyl-2-cyclohexene-1-one, M.P. 112–113°, 3-(cyclohexyl-methylamino)-4-cyano-5,5-dimethyl-2-cyclohexene-1-one, 3-(N-methyl-cyclohexyl-methylamino)-4-cyano-5,5-dimethyl-2-cyclohexene-1-one, M.P. 128–130°, 3-(4′-phenyl-4′-ethoxycarbonyl-piperidino)-4-cyano-5,5-dimethyl-2-cyclohexene-1-one, M.P. 149° (ethoxycarbonyl-carbethoxy), 3-antipyrylamino-4-cyano-5,5-dimethyl-2-cyclohexene-1-one, M.P. 273–275°.

Example 3

(a) A mixture of 12.6 parts of 3-ethylhexene-(3)-one-(5) and 10.5 parts by volume of cyanoacetic acid ethyl ester is added to a solution of 5.4 parts of sodium methylate in 50 parts by volume of anhydrous methanol and the mixture is then refluxed for 4 hours. After concentrating, water is added to the residue, the aqueous solution is extracted with ether, acidified with concentrated hydrochloric acid and extracted with methylene chloride. The methylene chloride solution is dried with sodium sulfate and concentrated. The 5,5-diethyl-6-cyano-cyclohexane-1,3-dione obtained can be recrystallized from acetone.

(b) 19.3 parts of 5,5-diethyl-6-cyano-cyclohexane-1,3-dione and 20.6 parts by volume of diethylamine and 30 parts by volume of anhydrous ethanol are heated for 4 hours at 170° in a closed vessel. After concentrating, the residue is dissolved in benzene, dried with sodium sulfate and concentrated. The 3-diethylamino-4-cyano-5,5-diethyl-2-cyclohexene-1-one which remains is crystallized from acetone/ether.

The following compound is produced in an analogous manner:

3-(N-methyl-benzylamino)-4-cyano-5,5-diethyl-2-cyclohexene-1-one, M.P. 161–163°.

Example 4

(a) 20 parts of 4-cyano-5,5-dimethyl-cyclohexane-1,3-dione are suspended in 100 parts by volume of phosphorus oxychloride and 3 parts by volume of water are slowly added while cooling with ice. The mixture is heated for 45 minutes at 100°, the phosphorus oxychloride is then removed by evaporation under vacuum and the residue is poured onto a mixture of ice and water. The water-insoluble parts are extracted with ether, the ether solution is dried over sodium sulfate and concentrated, and the concentrate is distilled under vacuum (oil pump) whereupon 3-chloro-4-cyano-5,5-dimethyl-2-cyclohexene-1-one is obtained.

(b) 6.8 parts of the above compound and 3.7 parts of n-propylamine in 20 parts by volume of anhydrous ethanol are refluxed for 90 minutes. The reaction solution is then concentrated in vacuo, 2 N-aqueous sodium hydroxide solution is then added to the residue which is then extracted with chloroform or methylene chloride. The chloroform or methylene chloride solution is washed with saturated sodium chloride solution, dried over sodium sulfate and concentrated. The residue is recrystallized from acetone whereupon 3-propylamino-4-cyano-5,5-dimethyl-2-cyclohexene-1-one is obtained. M.P. 155–156°.

Example 5

5.4 parts of the crude chloro compound obtained according to Example 4a and 4.42 parts of diethylamine in 15 parts by volume of anhydrous ethanol are refluxed for 2 hours. After working up as described in Example 4b and crystallization from acetone/ether, 3-diethylamino-4-cyano-5,5-dimethyl-2-cyclohexene-1-one is obtained. M.P. 134°.

*Example 6*

5.4 parts of the crude chloro compound obtained according to Example 4a and 6.4 parts of N-methylbenzylamine in 15 parts by volume of anhydrous ethanol are refluxed for 2 hours. After working up as described in Example 4b and crystallizing from acetone/ethanol, 3-(N-methylbenzylamino)-4-cyano-5,5-dimethyl-2-cyclohexene-1-one is obtained. M.P. 144–145°.

*Example 7*

10.7 parts of the crude chloro compound obtained according to Example 4a and 12.12 parts of di-n-propylamine in 30 parts by volume of anhydrous ethanol are refluxed for 1 hour. After working up as described in Example 4a and crystallizing from acetone/ether, 3-(di-n-propylamino)-4-cyano-5,5-dimethyl-2-cyclohexene-1-one is obtained. M.P. 84–86°.

When using 15.5 parts of di-n-butylamine or 23.9 parts of dibenzylamine instead of di-n-propylamine, 3-(di-n-butylamino)-4-cyano-5,5-dimethyl-2-cyclohexene-1-one or 3-dibenzylamino-4-cyano-5,5-dimethyl-2-cyclohexene-1-one, respectively, is obtained in an analogous manner.

*Example 8*

141 parts of benzylamine, 278 parts by volume of acetone and 118.5 parts by volume of cyanoacetic acid ethyl ester are stirred for 15 hours at 20°. The reaction solution is concentrated in vacuo and the residue is recrystallized from acetone/ether. The 3-benzylamino-4-cyano-5,5-dimethyl-2-cyclohexene-1-one thus obtained melts at 165–167°.

The following compounds are produced in an analogous manner:
3-ethylamino-4-cyano-5,5-dimethyl-2-cyclohexene-1-one, M.P. 167–168°,
3-propylamino-4-cyano-5,5-dimethyl-2-cyclohexene-1-one, M.P. 156–157°,
3-isopropylamino-4-cyano-5,5-dimethyl-2-cyclohexene-1-one, M.P. 188–189°,
3-butylamino-4-cyano-5,5-dimethyl-2-cyclohexene-1-one, M.P. 151–152°,
3-isobutylamino-4-cyano-5,5-dimethyl-2-cyclohexene-1-one, M.P. 153–154°,
3-allylamino-4-cyano-5,5-dimethyl-2-cyclohexene-1-one, M.P. 149–151°,
3-phenethylamino-4-cyano-5,5-dimethyl-2-cyclohexene-1-one, M.P. 156–157°,
3-hexylamino-4-cyano-5,5-dimethyl-2-cyclohexene-1-one, M.P. 125–126°,
3-cyclohexylamino-4-cyano-5,5-dimethyl-2-cyclohexene-1-one, M.P. 193–195°,
3-octylamino-4-cyano-5,5-dimethyl-2-cyclohexene-1-one, M.P. 102–104°,
3-decylamino-4-cyano-5,5-dimethyl-2-cyclohexene-1-one, M.P. 109–112°,
3-($\alpha$-phenyl-ethylamino)-4-cyano-5,5-dimethyl-2-cyclohexene-1-one, M.P. 220–221°,
3-[(2'-pyridylmethyl)-amino]-4-cyano-5,5-dimethyl-2-cyclohexene-1-one, M.P. 134–136°,
3-[(4'-pyridylmethyl)-amino]-4-cyano-5,5-dimethyl-2-cyclohexene-1-one, M.P. 220°–225°,
3-amylamino-4-cyano-5,5-dimethyl-2-cyclohexene-1-one, M.P. 133–135°,
3-isoamylamino-4-cyano-5,5-dimethyl-2-cyclohexene-1-one, M.P. 157–159°,
3-furfurylamino-4-cyano-5,5-dimethyl-2-cyclohexene-1-one, M.P. 140–141°,
3-($\beta$-dimethylamino-ethylamino)-4-cyano-5,5-dimethyl-2-cyclohexene-1-one, M.P. 144–145°,
3-($\beta$-hydroxy-ethylamino)-4-cyano-5,5-dimethyl-2-cyclohexene-1-one, M.P. 176–178°,
3-(N-methyl-ethylamino)-4-cyano-5,5-dimethyl-2-cyclohexene-1-one, M.P. 109–110°,
3-(N-methyl-propylamino)-4-cyano-5,5-dimethyl-2-cyclohexene-1-one, M.P. 126–127°,
3-methylamino-4-cyano-5,5-dimethyl-2-cyclohexene-1-one, M.P. 188–189°,
3-amino-4-cyano-5,5-dimethyl-2-cyclohexene-1-one, M.P. 220–222°,
3-($\beta$-aminoethylamino)-4-cyano-5,5-dimethyl-2-cyclohexene-1-one, M.P. 332–334°,
3-propylidenehydrazino-4-cyano-5,5-dimethyl-2-cyclohexene-1-one, M.P. 238–240°,
3-$\beta$-phenylhydrazino-4-cyano-5,5-dimethyl-2-cyclohexene-1-one, M.P. 156°.

*Example 9*

88.4 parts by volume of acetone, 51 parts of N-methylbenzylamine and 37.8 parts by volume of cyanoacetic acid ethyl ester are stirred for 15 hours at 20°. After concentrating the solution in vacuo, the remaining 3-(N-methylbenzylamino)-4-cyano-5,5-dimethyl-2-cyclohexene-1-one is recrystallized from acetone/ether. M.P. 144–145°.

3-(N-methyl-anilino)-4-cyano-5,5-dimethyl-2-cyclohexene-1-one is produced in an analogous manner. M.P. 121–122°.

*Example 10*

(a) 25 parts of 4-cyano-5,5-dimethyl-cyclohexane-1,3-dione are dissolved in 125 parts by volume of 2 N-aqueous sodium hydroxide solution and 21 parts of dimethyl sulfate are added while shaking well. The temperature rises to 50°. The whole is then refluxed for 30 minutes and, after cooling, the product is extracted with methylene chloride. The extract is dried over sodium sulfate, concentrated and the concentrate is distilled. The 3-methoxy-4-cyano-5,5-dimethyl-2-cyclohexene-1-one boils at 130° under 0.01 mm. Hg.

(b) 0.5 part of the above compound and 10 parts by volume of n-propylamine are refluxed for 2 hours. After evaporating, the residue is recrystallized from acetone-ether. The 3-propylamino-4-cyano-5,5-dimethyl-2-cyclohexene-1-one melts at 155–156°.

*Example 11*

1 part of the methoxy compound obtained according to Example 10a and 0.82 part of diethylamine are refluxed in 2 parts by volume of anhydrous ethanol for 15 hours. After evaporating, ether is added and the mixture is cooled a few degrees. The 3-diethylamino-4-cyano-5,5-dimethyl-2-cyclohexene-1-one crystallizes out and is recrystallized from acetone/ether. M.P. 134°.

*Example 12*

(a) 3.3 parts of 4-cyano-5,5-dimethyl-cyclohexane-1,3-dione are dissolved in 5 parts by volume of anhydrous pyridine and 2.4 parts by volume of mesyl chloride are added while cooling. The whole is left to stand for 2 hours whereupon the solution becomes dark colored and crystals separate out. The supernatant liquid is then decanted.

(b) 3 parts of the crude crystalline product obtained as described above are dissolved in 15 parts by volume of methylene chloride and the solution is refluxed for 15 hours with 12 parts by volume of propylamine. The reaction mixture is then concentrated in vacuo, 2 N-aqueous sodium hydroxide solution is added to the residue, it is extracted with ether, the ether is dried and evaporated. The crystalline residue is recrystallized from acetone/ether whereupon 3-propylamino-4-cyano-5,5-methyl-2-cyclohexene-1-one is obtained. M.P. 155–156°.

In an analogous manner, on reacting 4-cyano-5-methyl-5-isopropyl-cyclohexane-1,3-dione (M.P. 133–135°) with methylbenzylamine, 3-(N-methylbenzylamino)-4-cyano- 5-methyl-5-isopropyl-2-cyclohexene-1-one is obtained. It melts at 182–183°.

What is claimed is:
1. A compound of the formula

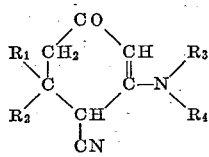

wherein
$R_1$ and $R_2$ independently of each other represent lower alkyl, and
$NR_3R_4$ represents a member selected from the group consisting of amino,
monoalkylamino having at most 12 carbon atoms,
lower alkenylamino,
di-(lower alkyl)amino,
amino-(lower alkenylene)-amino,
di-(lower alkyl)-amino-(lower alkenylene)-amino,
hydroxy-(lower alkylene)-amino,
phenylamino,
chlorophenylene-amino,
bromophenylene-amino,
nitrophenylene-amino,
hydroxyphenylene-amino,
(lower alkoxy)-phenylene-amino,
acetyl-phenylene-amino,
benzylamino,
chlorobenzylamino,
bromobenzylamino,
nitrobenzylamino,
lower alkylbenzylamino,
N-lower alkoxybenzyl-N-lower alkyl-amino,
di-(lower alkyl)-amino-benzylamino,
phenyl-(lower alkylene)-amino,
N-lower alkyl-anilino,
N-benzyl-N-lower alkyl-amino,
N-(chloro-benzyl)-N-lower alkyl-amino,
N-(bromo-benzyl)-N-lower alkyl-amino,
N-(nitro-benzyl)-N-lower alkyl-amino,
N-(lower alkyl-benzyl)-N-lower alkyl-amino,
N-(lower alkoxy-benzyl)-N-lower alkyl-amino,
N-(methylenedioxy-benzyl)-N-lower alkyl-amino,
N-[di-(lower alkyl)-amino-benzyl]-N-lower alkyl-amino,
N-phenyl-(lower alkylene)-N-lower alkyl-amino,
dibenzylamino,
naphthylamino,
cycloalkylamino,
N-cycloalkyl-N-lower alkyl-amino,
N-(cycloalkyl-lower alkylene)-amino,
N-(cycloalkyl-lower alkylene)-N-lower alkyl-amino,
1-pyrrolidyl,
piperidino,
pyridyl-lower alkylene-amino,
furfurylamino,
antipyrylamino,
N-furfuryl-N-lower alkyl-amino,
N-pyridyl-N-lower alkyl-amino,
N-[pyridyl-lower alkylene]-N-lower alkyl-amino,
4-phenyl-4-ethoxycarbonyl-piperidino,
morpholino,
phenylhydrazino, and
propylidenehydrazino.

2. 3-amino-4-cyano-5,5-dimethyl-2-cyclohexene-1-one.
3. 3-isopropylamino-4-cyano-5,5-dimethyl-2-cyclohexene-1-one.
4. 3-n-butylamino-4-cyano-5,5-dimethyl-2-cyclohexene-1-one.
5. 3-n-hexylamino-4-cyano-5,5-dimethyl-2-cyclohexene-1-one.
6. 3-benzylamino-4-cyano-5,5-dimethyl-2-cyclohexene-1-one.
7. 3-dimethylamino-4-cyano-5,5-dimethyl-2-cyclohexene-1-one.
8. 3-diethylamino-4-cyano-5,5-dimethyl-2-cyclohexene-1-one.
9. 3-(N-benzyl-N-methyl)-amino-4-cyano-5,5-dimethyl-2-cyclohexene-1-one.
10. 3-(N-benzyl-N-ethyl)-amino-4-cyano-5,5-dimethyl-2-cyclohexene-1-one.
11. 3-(4'-phenyl-4'-ethoxycarbonyl-piperidino)-4-cyano-5,5-dimethyl-2-cyclohexene-1-one.
12. 3-cyclohexylamino-4-cyano-5,5-dimethyl-2-cyclohexene-1-one.
13. 3-(β-phenyl-ethyl)-amino-4-cyano-5,5-dimethyl-2-cyclohexene-1-one.
14. 3-antipyrylamino-4-cyano-5,5-dimethyl-2-cyclohexene-1-one.

References Cited by the Examiner

UNITED STATES PATENTS

| | | | |
|---|---|---|---|
| 3,019,229 | 1/62 | Parsons | 260—294.3 |
| 3,024,241 | 3/62 | Frearson et al. | 260—294.3 |
| 3,088,967 | 5/63 | Pare | 260—464 |
| 3,096,360 | 7/63 | Sennewald et al. | 260—464 |
| 3,100,205 | 8/63 | Schulte et al. | 260—247.2 |

NICHOLAS S. RIZZO, *Primary Examiner.*